United States Patent
Cohen (10) Patent No.: US 6,461,468 B1
(45) Date of Patent: Oct. 8, 2002

(54) METHOD AND APPARATUS FOR MAKING DRIPPER LINES

(76) Inventor: Amir Cohen, Yuvalim, 20 142 Doar Na Gush Segev (IL)

( * ) Notice: Subject to any disclaimer, the term of this patent is extended or adjusted under 35 U.S.C. 154(b) by 0 days.

(21) Appl. No.: 09/701,416
(22) PCT Filed: Mar. 28, 1999
(86) PCT No.: PCT/IL99/00175
§ 371 (c)(1), (2), (4) Date: Nov. 29, 2000
(87) PCT Pub. No.: WO99/62691
PCT Pub. Date: Dec. 9, 1999

(30) Foreign Application Priority Data

Jun. 1, 1998 (IL) ................................................. 124704

(51) Int. Cl.[7] ............................................. B29C 47/02
(52) U.S. Cl. ............................. 156/244.13; 156/244.19; 156/244.27
(58) Field of Search ....................... 156/244.12, 244.13, 156/244.19, 244.27, 253

(56) References Cited

U.S. PATENT DOCUMENTS 6,179,949 B1 * 1/2001 Buluschek ............. 156/244.13

* cited by examiner

Primary Examiner—Michael W. Ball
Assistant Examiner—Barbara J. Musser
(74) Attorney, Agent, or Firm—G. E. Ehrlich Ltd.

(57) ABSTRACT

A method and apparatus for making a dripper line by feeding the dripper units (DU) into the extruded tube (ET) at a linear velocity, at the instant of their initial contact with the inner surface of the tube, which is greater than the linear velocity of the inner surface of the tube where initially contacted by the dripper units. The dripper units are fed between a track (10) within the extruded tube and a moving backing surface (20) externally of the tube spaced from the track to determine the final thickness of the extruded tube and the dripper unit welded thereto.

27 Claims, 9 Drawing Sheets

METHOD AND APPARATUS FOR MAKING DRIPPER LINES

FIELD AND BACKGROUND OF THE INVENTION

The present invention relates to a method and apparatus for making dripper lines as widely used in drip irrigation systems. The method and apparatus of the present invention are particularly useful for making dripper lines having the flat-type dripper units (i.e., non-cylindrical dripper units), and are therefore described below with respect to this application.

Dripper lines including the flat-type dripper units (i.e., non-cylindrical dripper units) have been in use for approximately 20 years and are extensively described in the patent literature, as shown, for example, by U.S. Pat. Nos. 4,728,042 and 4,307,841. A number of processes and apparatus have been developed for making such dripper lines, as described, for example, in U.S. Pat. Nos. 5,022,940, 5,122,044, 5,271,786, 5,282,916, 5,324,371 and 5,324,379.

OBJECTS AND BRIEF SUMMARY OF THE INVENTION

An object of the present invention is to provide another method and apparatus for making such dripper lines, which method and apparatus have a number of advantages, as will be described more particularly below.

According to one aspect of the present invention, there is provided a method of making a dripper line, comprising: extruding a tube through a calibrator; feeding a plurality of dripper units into the extruded tube and into contact with its inner surface; heat welding the dripper units to longitudinally spaced locations on the inner surface of the tube; and forming outlet openings in the tube communicating with the dripper units; characterized in that the dripper units are fed into the extruded tube so as to have a linear velocity, at the instant of their initial contact with the inner surface of the tube, which is greater than the linear velocity of the inner surface of the tube where initially contacted by the dripper units.

As will be described more particularly below, such a method provides a number of advantages. Thus, the above-cited U.S. Pat. Nos. 5,022,940, 5,122,044 and 5,324,371 describe feeding the dripper units so that their linear velocity, at the instant of initial contact with the inner surface of the extruded tube, is substantially equal to the linear velocity of the inner surface of the tube contacted by the dripper units in order to aviod weakening the extruded tube, which could obviously occur if the dripper units are travelling at a smaller linear velocity than the extruded tube. However, by making the linear velocity of the dripper units higher than that of the extruded tube at the instant of initial contact, this excess velocity of the dripper units aids the extruded tube in overcomming the resistance to which the extruded tube is subjected during its extrusion, and thereby avoids weakening the tube that may be caused by this resistance. In addition, the foregoing feature of the present invention enables the dripper units to be fed at a faster rate, and thereby enables higher productivity in the extrusion line.

Preferably, the linear velocity of the dripper units at the instant of their initial contact with the extruded tube should be from 15% to 75% greater than the linear velocity of the contacted surface of the extruded tube. The excess velocity would depend on a number of factors, particularly the resistance of the tube at that location of the extrusion process. It is anticipated that in some applications, the excess velocity would be in the order of 30%, and in other applications it would be in the order of 60%.

According to further features in the preferred embodiments of the invention described below, the extruded tube is extruded at a first diameter and is reduced in diameter as it passes through the calibrator. The entrance opening of the calibrator has a tapered surface decreasing in diameter in the downstream direction with respect to the entrance opening to allow limited outward deformation of the extruded tube when initially contacted by the dripper unit.

According to further features in some described preferred embodiments, the calibrator unit includes a backing surface engaging the outer surface of the extruded tube downstream of the entrance opening of the calibrator unit to limit outward deformation of the extruded tube when initially contacted by a dripper unit. Preferably, the backing surface is a moving backing surface, moving at the same linear velocity as the extruded tube where contacted by the dripper unit, and is located within the calibrator, preferably 20–50 mm downstream of the initial contact of the extruded tube with the calibrator.

According to another aspect of the invention, there is provided a method of making a dripper line, comprising: extruding a tube; feeding a plurality of dripper units into the tube and into contact with its inner surface at the time of extruding the tube; heat welding the dripper units to longitudinally spaced locations on the inner surface of the tube; and forming outlet openings in the tube communicating with the dripper units; characterzied in that each dripper unit is heat welded to the extruded tube by feeding the dripper units between a track within the extruded tube and a moving backing surface externally of the extruded tube; the distance between the moving backing surface and the track determining the final thickness of the extruded tube and dripper unit welded thereto.

The invention also provides apparatus for making dripper lines in accordance with the above method.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
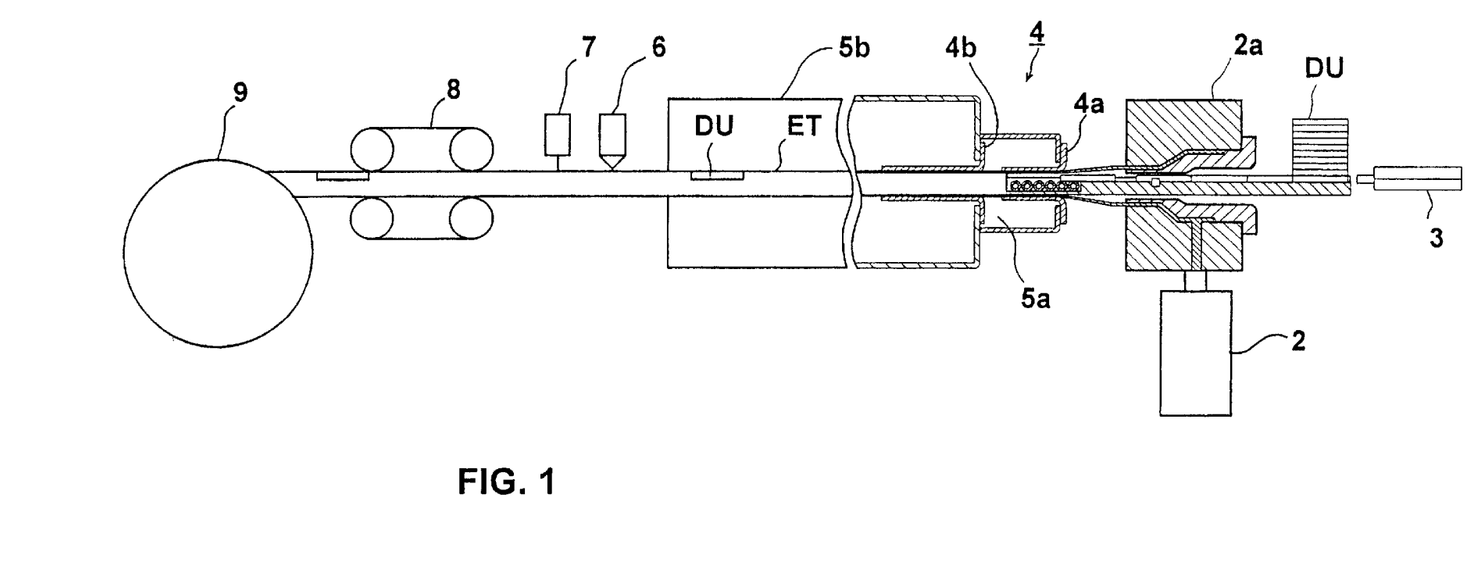
FIG. 1 illustrates one form of apparatus constructed in accordance with the present invention.

An overall apparatus constructed in accordance with the present invention for making dripper lines is illustrated in FIG. 1. Such dripper lines include two essential components, namely an extruded tube, generally designated ET, and a plurality of dripper units, each generally designated DU. The dripper units are fed into the tube at the time of its extrusion and are welded to the inner surface of the extruded tube at longitudinally spaced locations. Outlet openings are then formed in the tube to communicate with the dripper units therein.

FIG. 1 illustrates an extruder, generally designated 2, including an extrusion head 2a through which the tube ET is extruded. FIG. 1 also illustrates a feeder 3 for feeding the dripper units DU into the tube at the time of extrusion thereof for heat welding the dripper units to longitudinally spaced locations on the inner surface of the extruded tube. In the apparatus illustrated in FIG. 1, the initial contact of the dripper units DU with the inner surface of the extruded tube ET occurs at the entrance of a calibrator unit, generally designated 4, which fixes the outer diameter of the extruded tube ET after it has been stretched from a larger diameter at which it emerges from the extrusion head 2a. Calibrator unit 4 actually includes a pre-calibrator 4a and a final calibrator 4b downstream of the pre-calibrator 4a and separated therefrom by a cooling water bath 5a. Another cooling bath 5b is downstream of calibrator 4b.

Downstream of bath 5b are a perforator 6 for forming the outlet openings in the extruded tube ET communicating with the dripper units DU; a measuring device 7 for measuring the pipe thickness; a caterpillar type puller 8 for pulling the dripper line through the apparatus; and a take-up reel 9 for receiving the produced dripper line.

A Such apparatus insofar as described above is well known, and therefore further details of the construction and operation of the apparatus are not set forth herein.

Figure 2:
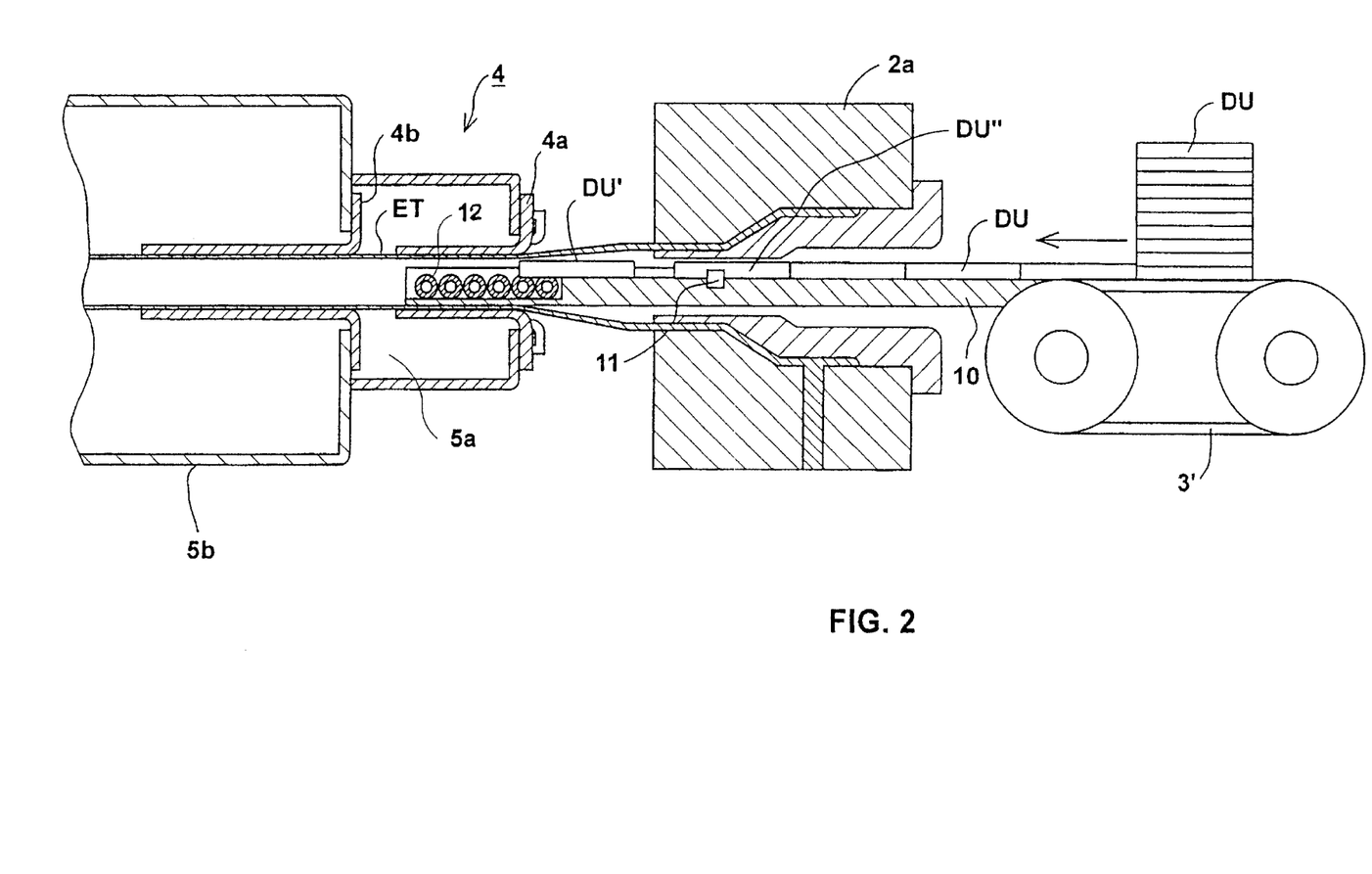
FIG. 2 is an enlarged view of a part of the apparatus of FIG. 1.
Figure 3:
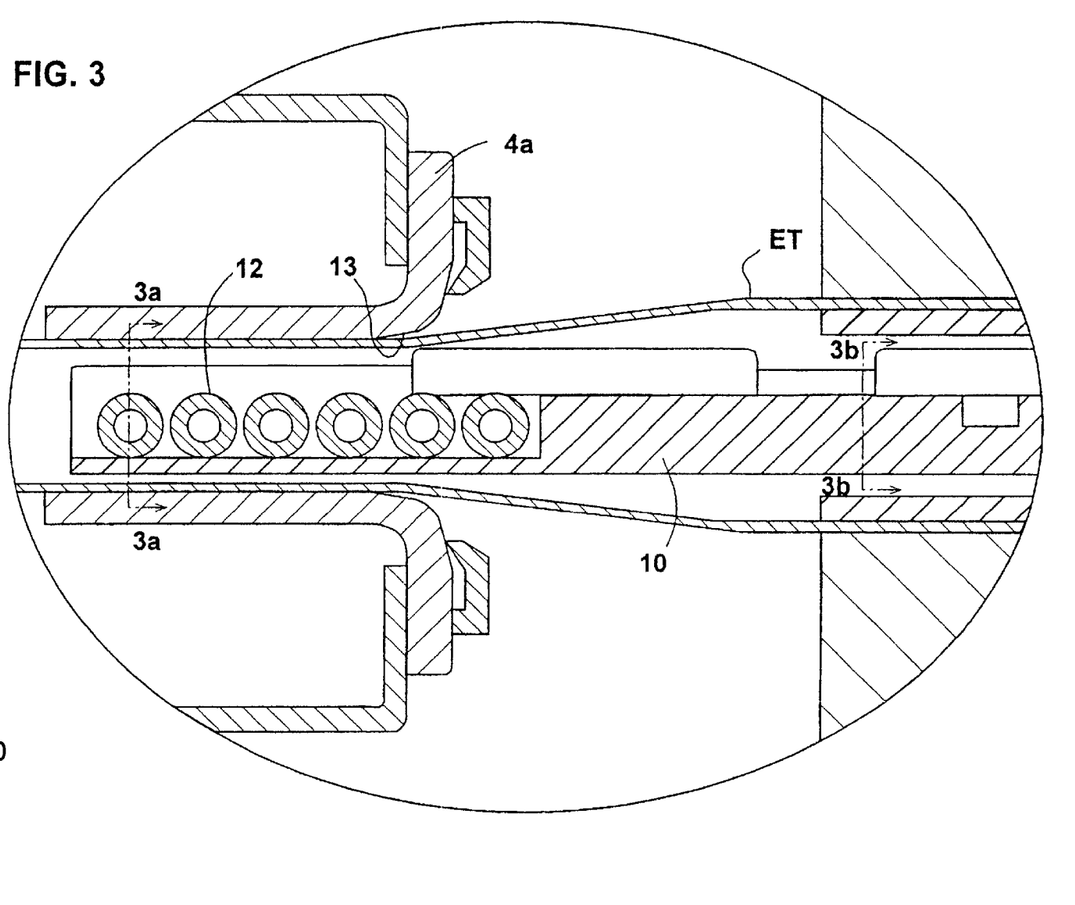
FIG. 3 is a further enlarged view of a part of the apparatus seen in FIG. 2.

FIGS. 2 and 3 more particularly illustrate the part of the apparatus of FIG. 1 embodying the present invention. While FIG. 1 illustrates the dripper unit feeder 3 as being of the piston type, in FIG. 2 it is shown as of the conveyor belt type, and therefore the feeder in FIG. 2 is designated 3'. It will be appreciated that any of the known types of feeders may be used for intermittently feeding the dripper units into the extruded tube at the required velocities, as described more particularly below.

As shown in FIGS. 2 and 3, the extruded tube ET exits from the extrusion head 2a at a relatively large diameter, and is stretched to a smaller diameter before it enters the pre-calibrator unit 4a. The dripper units DU are fed by the feeder 3' onto a track 10 which guides the dripper units to the extruded tube ET, one-by-one, such that each dripper unit makes initial contact with the tacky inner surface of the extruded tube ET just at the entrance of the pre-calibrator unit 4a. The dripper units DU are given a linear velocity, at the instant of their initial contact with the inner surface of the extruded tube ET, which velocity is greater than the linear velocity of the inner surface of the tube at the entrance to the pre-calibrator unit 4a. This excess velocity of the dripper units over that of the extruded tube aids the extruded tube in overcomming the resistance imposed by the entrance opening of the calibrator unit to the extruded tube as it passes through it with the dripper units adhering to the extruded tube. The result is that the extruded tube is not weakened by the difference in velocity between it and the dripper units.

As shown particularly in FIG. 2, track 10 supports a plurality of the dripper units DU in a line in abutting contact with each other. The feeder 3' in FIG. 2 (or the piston-type feeder 3 in FIG. 1) intermittently feeds each dripper unit DU into the first position of the line (rightmost in FIGS. 1 and 2) at a sufficiently high velocity to eject the dripper unit DU' in the last position of the line into contact with the inner surface of the extruded tube at the high linear velocity mentioned earlier.

Figure 3A:
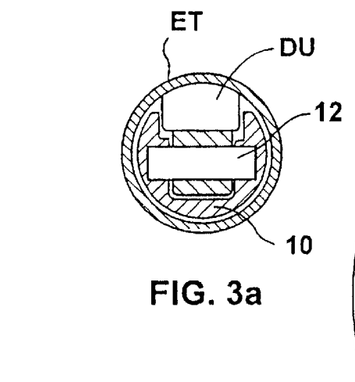
FIGS. 3a and 3b are sectional views, along lines 3a and 3b, respectively, of FIG. 3, more particularly illustrating the dripper unit and the feeding means for feeding it into direct contact with the extruded tube.
Figure 3B:
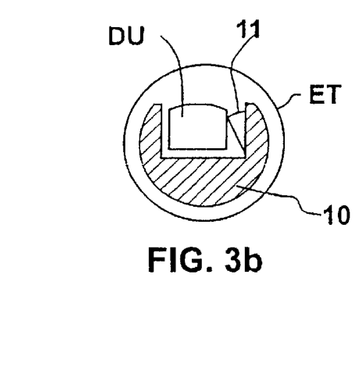

As shown particularly in FIG. 2, track 10 includes a spring-restrainer 11, in the position occupied by the next-to-last dripper unit (DU") in the line to restrain the ejection of that dripper unit, as well as those ahead of it in the line, so that only the last dripper unit DU' will be ejected. Spring restrainer 11 may be a simple leaf spring in a bowed configuration, such as shown in FIG. 3b, to lightly bear against the dripper unit in the next-to-the-last position in the line.

The foregoing arrangement thus decreases the transit distance to be travelled by each dripper unit DU, from the instant of impact of a dripper unit by the feeding device to initial contact of a dripper unit with the extruded tube ET. This decreases the transit time to be travelled by a dripper unit after each impact. This transit time is also decreased by the higher velocity imparted to the dripper unit, as compared to the previous arrangements. The above-described method of the present invention, therefore, enables the dripper units to be ejected at a higher rate than the previously-described arrangements, enabling the apparatus to be operated at a higher productivity rate.

The front end of track 10 includes a plurality of transversely-extending conveyor rollers 12 for conveying the dripper unit DU' ejected from the line into contact with the inner surface of the extruded tube ET at the entrance opening of the pre-calibrator unit 4a.

As shown particularly in FIG. 3, the entrance opening to the pre-calibrator unit 4a is formed with a tapered surface 13, decreasing in diameter in the inward direction. This tapered surface limits the outward deformation of the extruded tube ET when initially contacted at the high velocity by the emitter unit DU. After the emitter unit DU initially contacts the extruded tube, it is carried forward along rollers 12 which press the dripper unit into firm contact for its complete length with the tacky inner surface of the extruded tube, as the pre-calibrator 4a engages the outer surface of the extruded tube to also fix its final dimensions.

The extruded tube, with the dripper unit fixed to its inner surface, then passes through cooling bath 5a, the final calibrator unit 4b, and the final bath 5b. As it exits from the latter, it is perforated by perforator 6, and its thickness is measured by measuring device 7 as it is pulled by the caterpillar drive 8, and then wound on the take-up reel 9.

Figure 4:
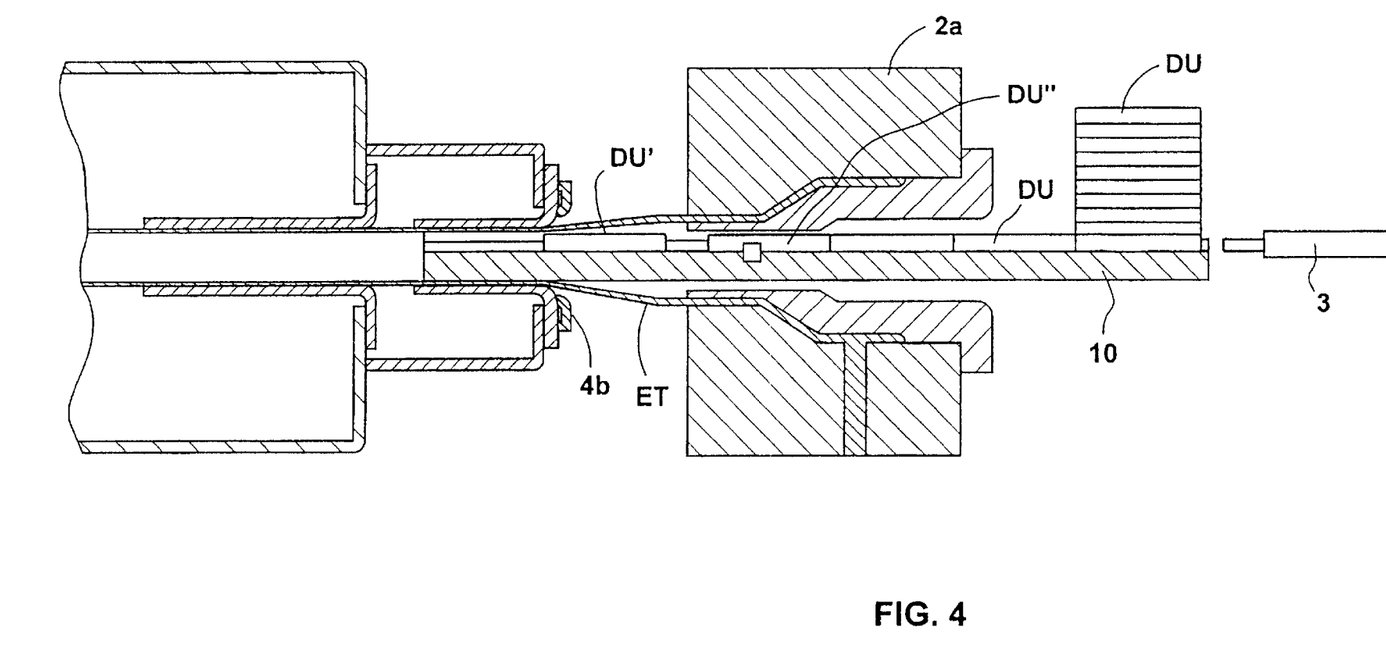
FIG. 4 illustrates a modification in the construction of the apparatus of FIGS. 1–3.
Figures 5, 5A:
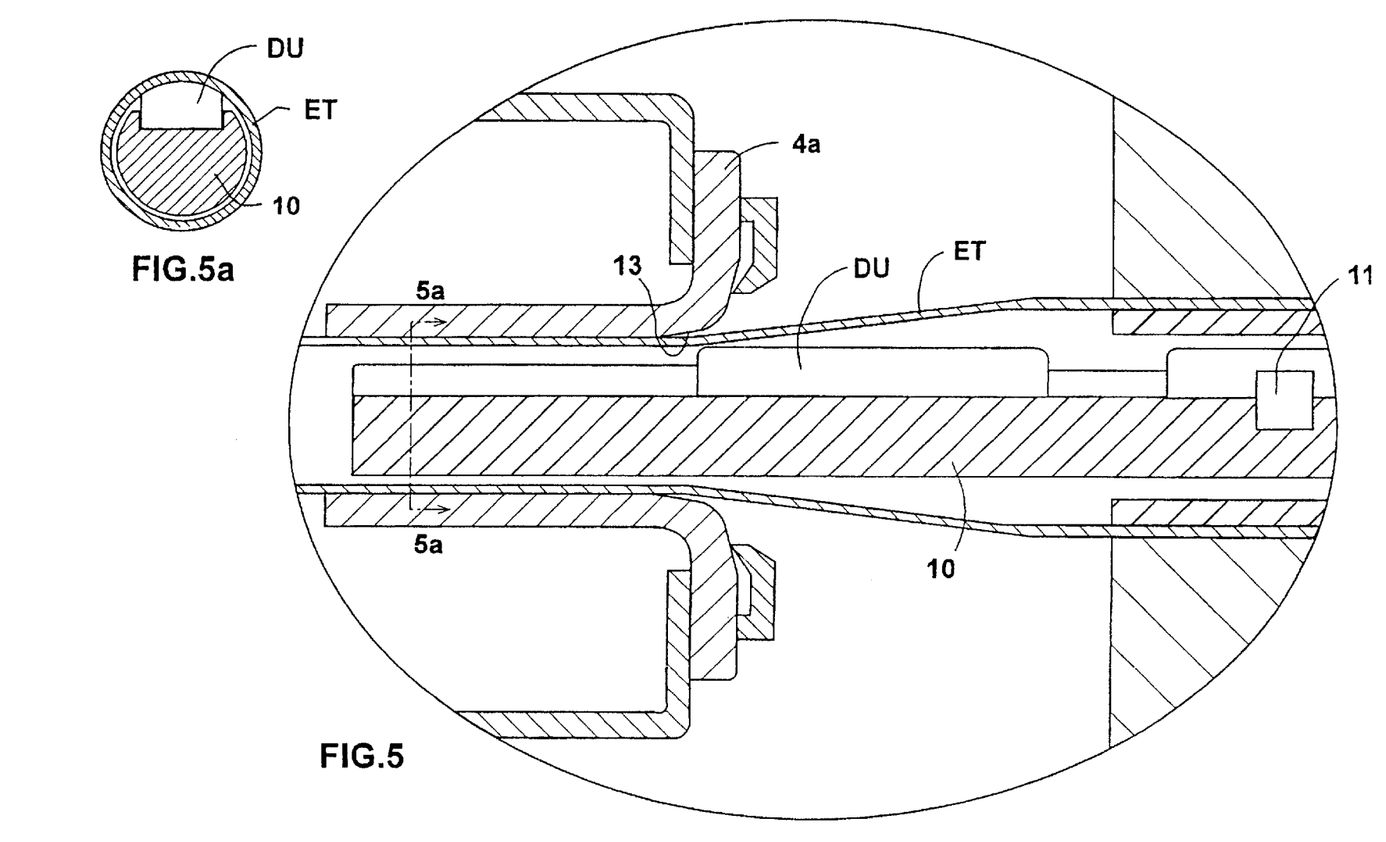
FIG. 5 is an enlarged view of a portion of the apparatus of FIG. 4.
FIG. 5a is a sectional view along line 5a of FIG. 5 more particularly illustrating the dripper unit and the track feeding it into contact with the extruded tube.

The apparatus illustrated in FIGS. 4, 5 and 5a is similar to that described above with respect to FIGS. 2, 3 and 3a, except that the dripper unit feeder is of the piston type, as shown at 3; in addition, the rollers 12 on the track 10 are omitted, such that each dripper unit DU is slid over the upper surface of the track into contact with the inner surface of the extruded tube ET.

Figure 6:
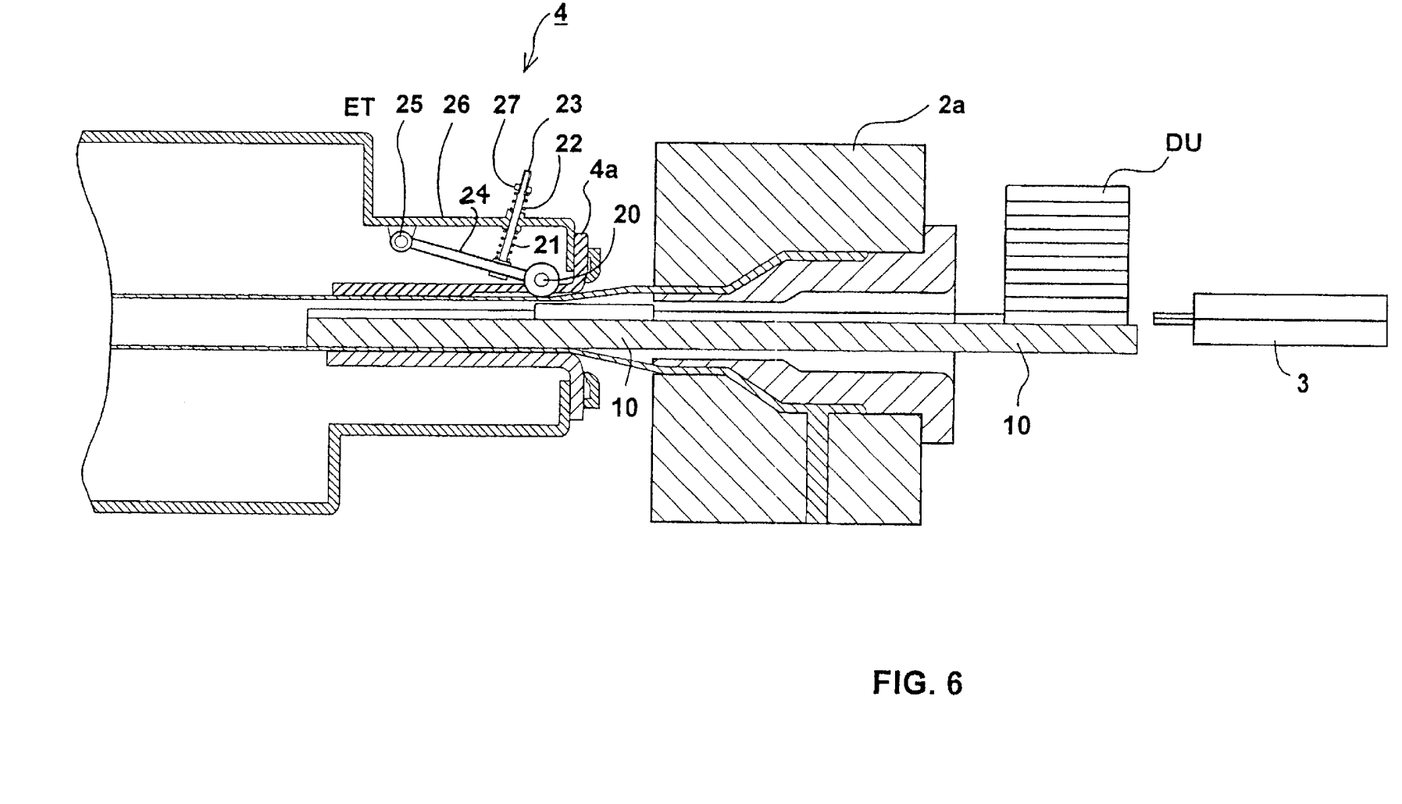
FIG. 6 illustrates another embodiment of the present invention.
Figures 7, 7A:
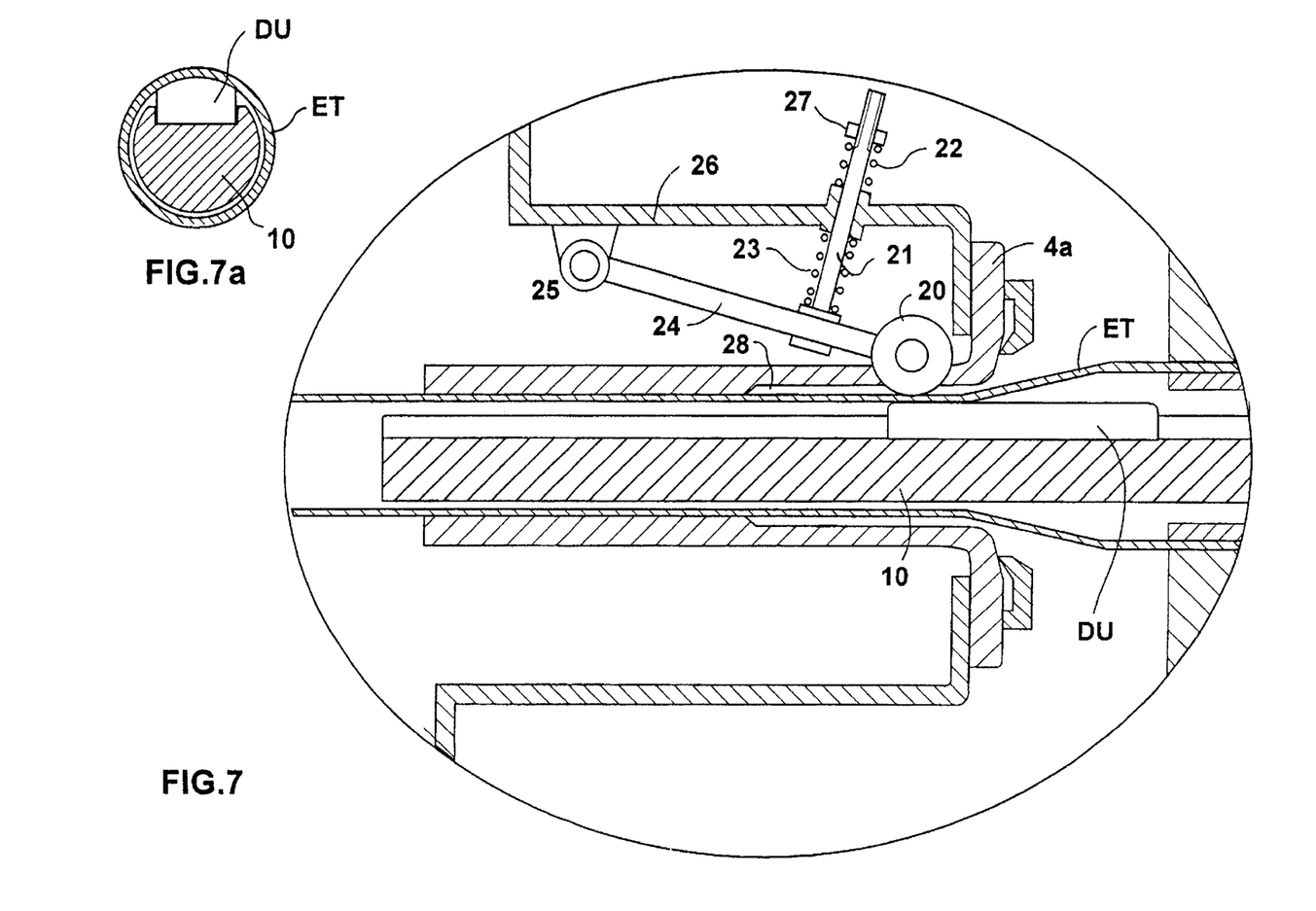
FIG. 7 is an enlarged view of a portion of FIG. 6.
FIG. 7a is a view corresponding to that of FIG. 5a but with reference to the apparatus of FIG. 7.

FIGS. 6, 7 and 7a illustrate a modification in the apparatus, particularly at the entrance opening to the pre-calibrator unit 4a where each dripper unit DU initially contacts the extruded tube ET. In this modification, a moving backing surface, in the form of a spring-biassed roller 20, is provided at the entrance opening of the pre-calibrator unit 4a, to engage the outer surface of the extruded tube, and thereby to limit its outward deformation when initially contacted by a high-velocity dripper unit DU.

Roller 20 is spring-urged towards the outer surface of the extruded tube ET by a spring assembly including two springs 21, 22 acting on a rod 23. Rod 23 bears on an arm 24 carrying the roller 20 at one end, and pivotally mounted at its opposite end 25 to a fixed ledge 26 of the apparatus. Rod 23 is threaded at its outer end and receives a threaded nut 27. Spring 21 is between pivotal arm 24 and fixed ledge 26, and urges the roller 20 towards the extruded tube ET. Spring 22 is between ledge 26 and nut 27, and urges roller 20 away from the outer surface of the extruded tube according to the position of nut 27. Thus, nut 27 may be adjusted to cause roller 20 to apply a very light contact to the outer surface of the extruded tube, sufficiently only to limit its outward deformation when it is initially contacted by the dripper unit DU. Since roller 20 is urged into contact with the outer surface of the extruded tube, it defines a moving backing surface travelling at the same linear velocity as the extruded tube.

Since roller 20 is urged into contact with the outer surface of the extruded tube, it defines a moving backing surface travelling at the same linear velocity as the extruded tube. Preferably, roller 20 is located 20–150 mm downstream of the initial contact of the extruded tube with calibrator unit 4a.

As further seen in FIG. 7, roller 20 is received in an axially-extending slot 28 formed in the calibrator unit 4a at its entrance opening, and extending for a short distance within the calibrator.

Figure 8:
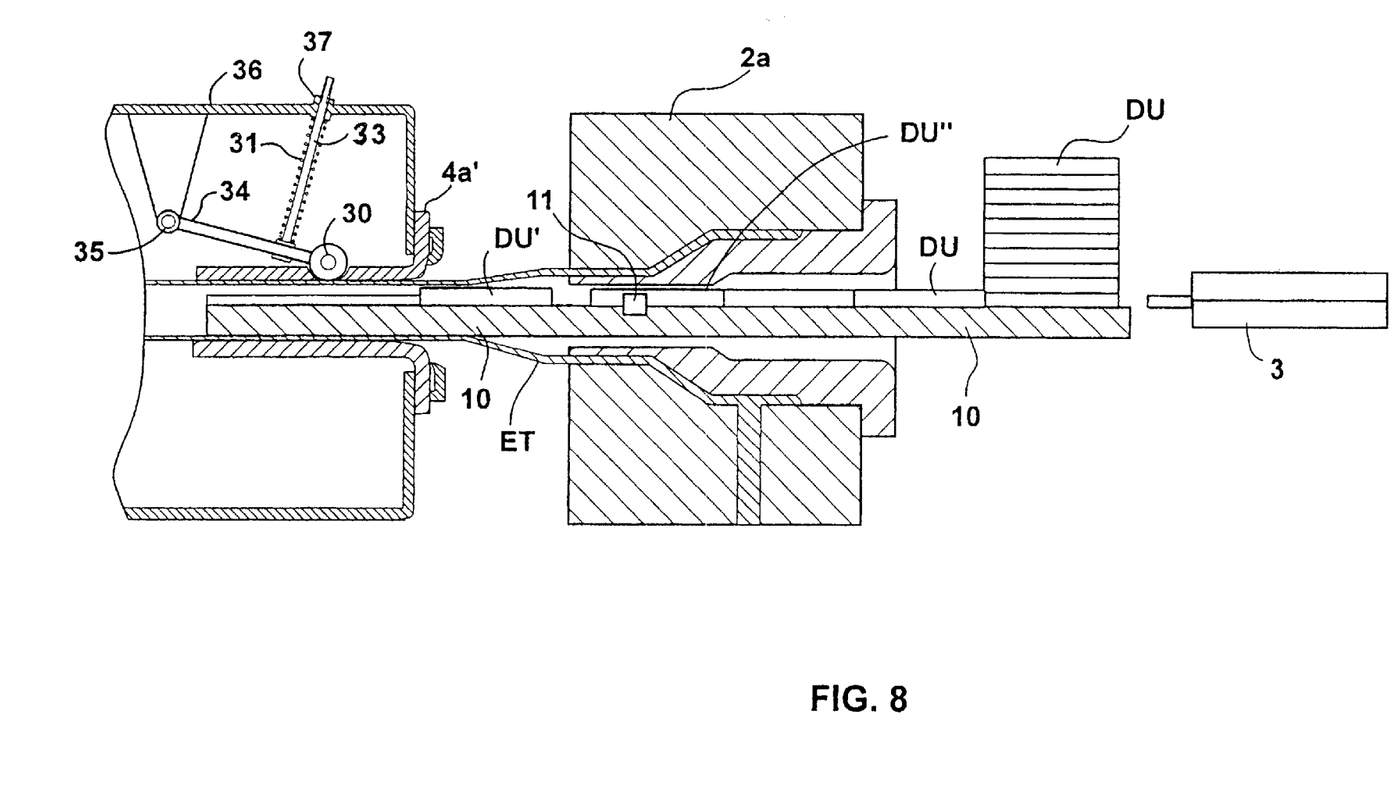
FIG. 8 illustrates a further form of apparatus constructed in accordance withthe present invention.
Figure 9:
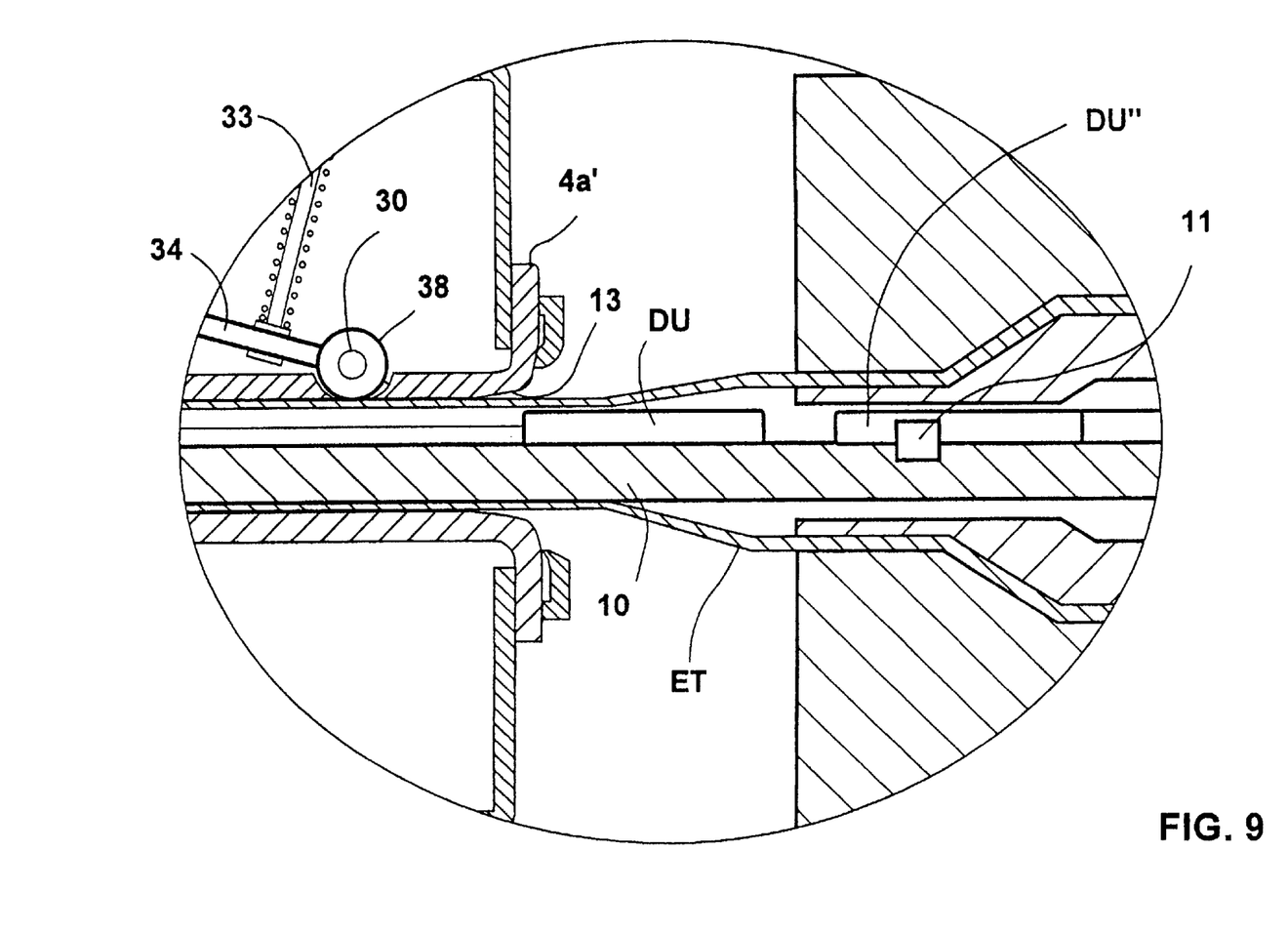
FIG. 9 is an enlarged view of a portion of the apparatus of FIG. 8.

FIGS. 8 and 9 illustrate a variation similar to that of FIGS. 6 and 7, also including a spring-biassed roller, therein designated 30, at the entrance end of the calibrator unit 4a. In this case, however, roller 30 is biassed by a spring-assembly including a single spring 31 mounted on a rod 33 bearing against a lever arm 34 carrying the roller 30 at one end, and pivotally mounted at its opposite end 35 to a fixed ledge 36 of the apparatus. Adjustment of the distance between roller 30 and track 10, and thereby the thickness of the weld of the dripper units DU and the extruded tube ET, is effected by a nut 37 threaded on the outer end of rod 33. As shown particularly in FIG. 9, the roller 30 is also received within a recess 38, but this recess is of a size merely to accommodate the roller and is located slightly downstream from the entrance opening of the pre-calibrator unit 4a. Since roller 30 is maintained in contact with the outer surface of the extruded tube, it also defines a moving backing surface travelling at the same linear velocity as the extruded tube where contacted by the dripper units.

While the invention has been described with respect to several preferred embodiments, it will be appreciated that these are set forth merely for purposes of example, and that many other variations, modifications and applications of the invention may be made.

What is claimed is:

1. A method of making a dripper line, comprising:
   extruding a tube through a calibrator;
   feeding a plurality of dripper units into the extruded tube and into contact with its inner surface;
   heat welding said dripper units to longitudinally spaced locations on the inner surface of the tube;
   and forming outlet openings in the tube communicating with said dripper units;
   characterized in that said dripper units are fed into the extruded tube so as to have a linear velocity, at the instant of their initial contact with the inner surface of the tube, which is greater than the linear velocity of the inner surface of the tube where initially contacted by the dripper units.

2. The method according to claim 1, wherein said extruded tube is extruded at a first diameter and is reduced in diameter as it passes through the calibrator; the entrance opening of the calibrator having a tapered surface decreasing in diameter in the downstream direction with respect to said entrance opening to allow limited outward deformation of the extruded tube when initially contacted by the dripper unit.

3. The method according to claim 1, wherein the calibrator includes a backing surface engaging the outer surface of the extruded tube downstream of said entrance opening of the calibrator to limit outward deformation of the extruded tube when contacted by a dripper unit.

4. The method according to claim 3, wherein said backing surface is a moving backing surface moving at the same linear velocity as the extruded tube where contacted by the dripper unit.

5. The method according to claim 4, wherein said moving backing surface is within the calibrator.

6. The method according to claim 4, wherein said moving backing surface is from 20–150 mm downstream of the initial contact of the extruded tube with the calibrator.

7. The method according to claim 4, wherein said dripper units are fed into the extruded tube on a track which guides the dripper units into contact with the inner surface of the extruded tube; said moving backing surface being spaced from said track a predetermined distance determining the final thickness of the extruded tube and dripper unit welded thereto.

8. The method according to claim 7, wherein said moving backing surface and said track are adjustable relative to each other to vary the pressure applied by them to the extruded tube and dripper unit.

9. The method according to claim 7, wherein said moving backing surface and said track are adjustable relative to each other to vary the distance between them for adjusting said final thickness of the extruded tube and dripper unit welded thereto.

10. The method according to claim 7, wherein said track includes a plurality of conveyor rollers to convey the dripper units into contact with the extruded tube.

11. The method according to claim 1, wherein the linear velocity of the dripper units at the instant of said initial contact with the inner surface of the extruded tube is from 15% to 75% greater than the linear velocity of the contacted surface of the extruded tube.

12. Apparatus for making dripper lines, comprising:
   an extruder for extruding a tube;
   a calibrator through which said extruded tube is passed;
   a feeder for feeding a plurality of dripper units into the tube at the time of extrusion thereof and for heat welding said dripper units to longitudinally spaced locations on the inner surface of the tube;

and a perforator for forming outlet openings in the tube communicating with said dripper units;

characterized in that said feeder feeds the dripper units into the tube to have a linear velocity, at the instant of their initial contact with the inner surface of the extruded tube, which is greater than the linear velocity of the inner surface of the tube when initially contacted by the dripper units.

13. The apparatus according to claim 12, wherein said feeder feeds the dripper units to have a linear velocity, at the instant of said initial contact, from 15% to 75% greater than the linear velocity of the contacted surface of the extruded tube.

14. The apparatus according to either of claims 12 or 13, wherein said extruded tube is extruded at a first diameter and is reduced in diameter as it passes through said calibrator; the entrance opening of the calibrator having a tapered surface decreasing in diameter in the downstream direction with respect to said entrance opening to allow limited outward deformation of the extruded tube when contacted by the dripper unit.

15. The apparatus according to claim 12, wherein said calibrator includes a backing surface engaging the outer surface of the extruded tube downstream of said entrance opening of the calibrator to limit outward deformation of the extruded tube when contacted by a dripper unit.

16. The apparatus according to claim 15, wherein said backing surface is a moving backing surface moving at the same linear velocity as the extruded tube where contacted by the dripper unit.

17. The method according to claim 16, wherein said moving backing surface is within the calibrator.

18. The method according to claim 16, wherein said moving backing surface is from 20–150 mm downstream of the initial contact of the extruded tube with the calibrator.

19. The apparatus according to claim 16, wherein said dripper units are fed into the extruded tube on a track which guides the dripper units into contact with the inner surface of the extruded tube; said moving backing surface being spaced from said track a predetermined distance determining the final thickness of the extruded tube and dripper unit welded thereto.

20. The apparatus according to claim 19, wherein the distance between said moving backing surface and said track is adjustable.

21. The method according to claim 19, wherein said moving backing surface and said track are adjustable relative to each other to vary the pressure applied by it to the extruded tube and dripper unit.

22. The apparatus according to claim 16, wherein said moving surface is a spring-biassed roller mounted on a pivotal lever and including an adjustable spring assembly.

23. The apparatus according to claim 22, wherein said adjustable spring assembly adjusts the net force applied by the roller against said extruded tube and includes a first spring acting to bias the roller towards the extruded tube, a second spring acting to bias the roller away from the extruded tube, and an adjusting device for adjusting the force applied by at least one of said springs.

24. The apparatus according to claim 16, wherein said moving backing surface includes a spring acting to bias the roller towards the extruded tube, and an adjusting device for adjusting the location of the roller, and thereby the thickness of the welding of the dripper units to the inner surface of the tube.

25. The apparatus according to claim 22, wherein said spring-biassed roller projects into a longitudinal recess formed in the calibrator unit downstream of its inlet opening.

26. The apparatus according to claim 12, wherein said feeder intermittently feeds the dripper units into the extruded tube on a track which guides the dripper units to their points of contact with the inner surface of the extruded tube.

27. The apparatus according to claim 26, wherein said track includes a plurality of conveyor rollers to convey the dripper units into contact with the extruded tube.

* * * * *